F. HUTH.
SAFETY BRAKE FOR ELEVATORS, HOISTS, AND LIFTS.
APPLICATION FILED MAY 31, 1911.
1,023,252.
Patented Apr. 16, 1912.
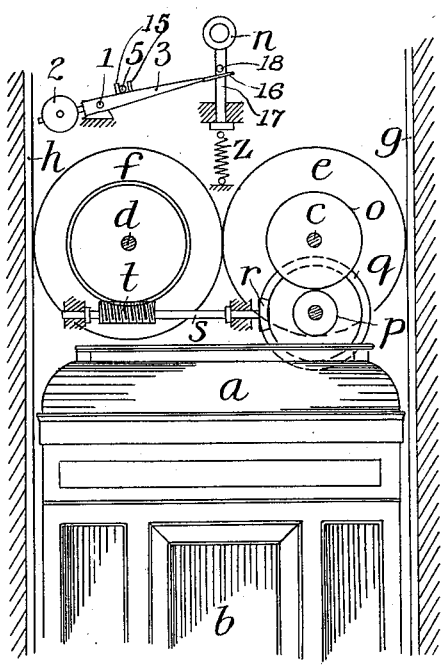
Fig. 1.
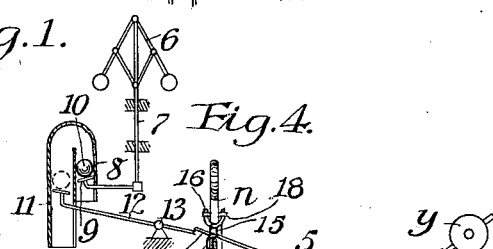
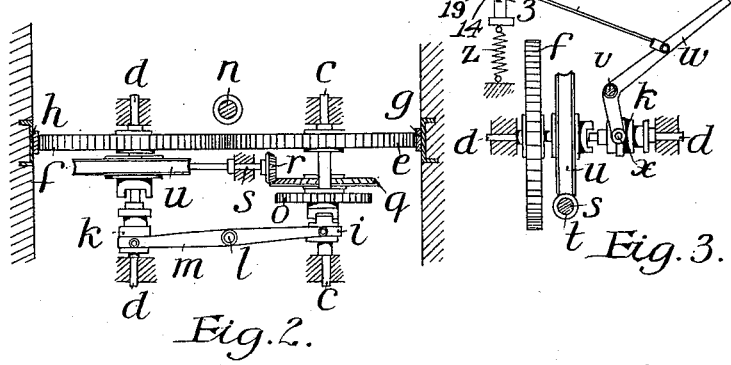
Witnesses
Inventor
Ferdinand Huth.

UNITED STATES PATENT OFFICE.

FERDINAND HUTH, OF SCHIFFBEK, NEAR HAMBURG, GERMANY.

SAFETY-BRAKE FOR ELEVATORS, HOISTS, AND LIFTS.

1,023,252.

Specification of Letters Patent.

Patented Apr. 16, 1912.

Application filed May 31, 1911. Serial No. 630,338.

*To all whom it may concern:*

Be it known that I, FERDINAND HUTH, a subject of the King of Prussia, and resident of No. 79ª Hamburgerstrasse, Schiffbek, near Hamburg, in the Empire of Germany, have invented a new and useful Safety-Brake for Elevators, Hoists, and Lifts, of which the following is a specification.

This invention relates to a safety brake designed for use in connection with elevators, hoists and lifts for automatically arresting the downward motion of the car and bringing the same to a gradual and complete stop in the event of accidents, such as the breaking of the hoisting rope or cable.

Special objects of the invention are to render more efficient, serviceable and durable in operation safety brakes of the kind referred to.

I will now proceed to describe my invention more fully, reference being had to the accompanying drawings, in which—

Figure 1 is a diagrammatic elevation of the improved safety brake mounted on top of an elevator car. Fig. 2 is a top view of the improved safety brake under normal working conditions. Fig. 3 is a side elevation of the worm gear employed in the improved safety brake. Fig. 4 shows a modified construction for automatically actuating the improved safety brake.

On the top $a$ of the elevator car $b$ are rotatably mounted in suitable bearings the shafts $c$ and $d$, to which are keyed the toothed wheels $e$ and $f$. These toothed wheels $e$ and $f$ mesh with one another and with racks $g$, $h$ vertically attached at opposite sides to the elevator shaft in the full extent thereof. While the car $b$ is in motion the toothed wheels $e$ and $f$ are thus driven in opposite directions.

According to this invention the toothed wheels $e$ and $f$ are adapted to be arrested by a worm gear. For this purpose the two shafts $c$ and $d$ are each provided with a clutch coupling $i$ and $k$ respectively. The sleeve members of these clutch couplings $i$ and $k$ are longitudinally movable on, but by feathering or the like, rotatable with the shafts $c$ and $d$ respectively. Further, they are both in engagement with a two-armed lever $m$ centrally fulcrumed around the vertical axis $l$.

In the normal working conditions of the elevator, hoist or lift the clutch coupling $i$ on the shaft $c$ is put in gear, whereas through the intermediary of the two-armed lever $m$ the clutch coupling $k$ on the shaft $d$ is disconnected, as indicated in Fig. 2. This is attained by the assistance of the suspending eye $n$ effecting the connection between the elevator car $b$ and the hoisting rope or cable, said suspending eye $n$ being vertically movable to a limited extent and being in positive connection with the actuating gear of the clutch couplings, as will be described later on.

While the clutch coupling $i$ is put in gear, it imparts rotation to the toothed wheel $o$ loosely mounted on the shaft $c$. This toothed wheel $o$ meshes with a pinion $p$, on the shaft of which is keyed a bevel wheel $q$ in engagement with the bevel pinion $r$. The shaft $s$ of this bevel pinion $r$ carries fixed thereto a worm $t$, which thus participates in the rotation of the toothed wheel $o$ and in its turn imparts rotation to the worm wheel $u$ at the same speed and in the same direction as the toothed wheel $f$. This worm wheel $u$ is loosely mounted on the shaft $d$ but attached to the clutch $k$, so that it is adapted to be coupled with the shaft $d$ on putting this clutch $k$ in gear.

The alternately working clutch couplings $i$ and $k$ are actuated by an angle lever $w$ fulcrumed around the axis $v$. This angle lever $w$ engages an annular groove in the movable sleeve member of the clutch $k$ with a fork at its end $x$ and carries at the other extremity an adjustable weight $y$. Between the suspending eye $n$ of the elevator car $b$ and the angle lever $w$ is provided a connection in such a manner that when the hoisting rope or cable breaks and in consequence thereof the suspending eye $n$ is pulled toward the top $a$ of the elevator car $b$ by means of a spring $z$, the lever $w$ turns around its axis $v$ under the force of the weight $y$ and puts the clutch $k$ in gear, while simultaneously the clutch $i$ is disconnected through the intermediary of the two-armed lever $m$. The reversion in the gear of the clutches stops the driving impulse imparted from the toothed wheel $e$ by the shaft $c$ of the latter and by the clutch $i$ to the toothed gearing $o$, $p$, $q$, $r$ but instead effects a positive connection between the worm wheel $u$ and the shaft $d$ by means of the thrown-in clutch $k$. The engagement of the worm wheel $u$ in the worm $t$ naturally precluding the transmission of motive power, the toothed wheels $f$ and $e$ will be stopped in the racks $h$ and $g$ respectively, thus bringing the elevator car gradually to a standstill, as explained below.

The connection between the angle lever $w$ and the movably supported suspending eye $n$ of the elevator car $b$ is effected by the intermediary of a link 5, pivotally attached to the angle lever $w$ and of a two armed lever 3, the link 5 carrying a hook 14 at its free end and engaging with this hook the lever 3 between two upright studs 15, as indicated in Figs. 1 and 3. The bearing afforded to the hook 14 of the link 5 by the studs 15 on the lever 3 is so positioned, that the link 5 is directed in the plane of oscillation of the angle lever $w$. By this arrangement the oscillations of the angle lever $w$ are protected against obstructions due to component forces which would arise in case of direct attachment of the link 5 to the suspending eye $n$. The two-armed lever 3, which is fulcrumed around the axis $l$ and carries at its free arm the adjustable weight 2 is pivotally attached in any suitable known manner to the suspending eye $n$. In the construction indicated in the drawing, the lever 3 is bifurcated at its free end and engages with this fork 16 the shank 17 of the suspending eye $n$ beneath two radial studs 18 against which it is pressed by the force of the counter weight 2. The angle lever $w$ thus suspended by the link 5 against the force of the weight $y$, is held in a position which keeps the clutch $k$ disconnected until the hoisting rope or cable breaks, when the suspending eye $n$ will be pulled by the spring $z$ toward the roof of the car $b$. This movement of the suspending eye $n$ relatively to the car $b$ forces the lever 3 downward and allows the weight $y$ to exert its force on the angle lever $w$ to such an extent that the clutch $k$ is thrown-in and locks the worm wheel $u$ to its shaft $d$, whereas simultaneously the clutch $i$ is disconnected through the intermediary of the two-armed lever $m$, so that the toothed wheel $o$ is uncoupled from its shaft $c$. By virtue of the *vis inertia* present in the gear the worm $t$ before it is arrested and locks the gear wheels $e$, $f$, is still capable of performing a few revolutions on coupling the clutch $k$. This prolonged rotation of the worm $t$ produces therefore a gradual stop of the car $b$ without detrimental shocks.

The modified construction according to Fig. 4 renders the actutation of the safety brake dependent upon the speed of travel of the car and in consequence not only prevents accidents in the event of the hoisting rope or cable breaking but also safeguards against disorderly working of the elevator in the event of a failure in the action of the ordinary brake of the hoisting machinery. On the top $a$ of the elevator car $b$ is mounted a centrifugal governor 6 driven by any suitable gear, not shown. The vertically movable shaft 7 of this centrifugal governor 6 extends through a slot into a vertical tube 8 and carries inside this tube an inclined support 9 for the reception of a ball 10. When the speed of the downward motion of the car $b$ exceeds a certain limit, the centrifugal governor 6 lifts the shaft 7 to such a height, that the ball 10 drops from the inclined support 9 over the top edge of the tube 8 into an adjacent vertical tube 11. In this second tube 11 the ball 10 hits upon a dish carried by a two-armed lever 12, which enters through a slot. The two-armed lever 12 is fulcrumed around the axis 13 and capable to disengage the link 5 from the lever 3, which holds the weighted angle lever $w$ in its elevated position. This disengagement of the link 5 is effected in the construction shown by the lever 12 abutting against the lower face of an extension 19 at the hooked end 14 of the link 5. When the angle lever $w$ is thus set free, the force of the weight $y$ turns same to such an extent that the clutch $k$ is coupled and the car is stopped in the manner hereinbefore described.

What I do claim as my invention, and desire to secure by Letters Patent, is:

1. In an automatic elevator brake, the combination with the car, intermeshing toothed wheels on top of the car and stationary racks in the elevator well with which said toothed wheels mesh, of rotary shafts $c$, $d$ upon which said intermeshing toothed wheels $e$, $f$ are secured, a toothed wheel gearing $o$, $p$, $q$, $r$ adapted to be driven from one of said rotary shafts $c$, a worm gearing $s$, $t$, $u$ driven from the said toothed wheel gearing, the worm wheel $u$ of said worm gearing being loosely mounted upon the other of said rotary shafts $d$, clutch mechanisms $i$ and $k$ respectively on each of said rotary shafts $c$, $d$, a lever $m$ governing said clutch mechanisms so that while one is coupled the other is uncoupled, a suspending element $n$ on top of the car vertically movable to a limited extent, and means controlled by said suspending element for actuating the clutch mechanisms, so that the worm wheel is fixed to its shaft and brakes the car by being gradually blocked in the worm should the hoisting rope or cable break or the speed of travel of the car become excessive, substantially as set forth.

2. In an automatic elevator brake, the combination with the car, intermeshing toothed wheels on top of the car and stationary racks in the elevator well with which said toothed wheels mesh, of rotary shafts $c$, $d$ upon which said intermeshing toothed wheels $e$, $f$ are secured, a toothed wheel $o$ loosely mounted upon one of said rotary shafts $c$, a worm wheel $u$ loosely mounted upon the other of said rotary shafts $d$, clutch mechanisms $i$, $k$ for coupling either the said toothed wheel $o$ or the said worm wheel $u$ with its respective shaft, a lever $m$ governing said clutch mechanisms so that one is active while the other is inactive, a toothed wheel gearing $p$, $q$, $r$ meshing with the said toothed wheel $o$ which is under the influence of the clutch mechanism $i$, a worm gearing $s$, $t$ driven from the said toothed wheel gearing imparting rotation to the worm wheel $u$ at the same speed at which its rotary shaft $d$ is driven by the intermeshing gears $e$, $f$ traveling along the racks $g$, $h$ in the elevator well, a suspending element $n$ on top of the car vertically movable to a certain extent, means controlled by said suspending element for normally coupling through the intermediary of the clutch mechanism $i$ the aforesaid toothed gearing $o$, $p$, $q$, $r$ to its shaft $c$ and means controlled by said suspending element for reversing the clutch mechanisms should the hoisting rope or cable break or the speed of travel of the car become excessive, so that the worm wheel $u$ is fixed to its shaft $d$ and brakes the car by being gradually blocked in the worm $t$, substantially as set forth.

3. In an automatic elevator brake, the combination with the car, intermeshing toothed wheels on top of the car, stationary racks in the elevator well with which said toothed wheels mesh, rotary shafts upon which said intermeshing toothed wheels are secured, gears including a worm for coupling together the said rotary shafts apart from the coupling effected by the intermeshing toothed wheels secured upon said shafts and alternately acting clutch mechanisms on the said rotary shafts, of a centrifugal governor 6, a vertically movable shaft 7 positioned by said governor, an inclined support 9 carried by said shaft 7, a slotted tube 8 entered by the said shaft so that the inclined support 9 is encircled thereby, a ball 10 placed on said support 9, an adjacent tube 11, a two-armed lever 12 entering said tube 11 through a slot therein, a dish carried by said two-armed lever 12 inside the tube 11 and means controlled by said two-armed lever 12 under the gravitating force of the ball 10 hitting the dish thereof for reversing the clutch mechanisms so that the worm wheel is blocked in the worm and the car gradually stopped thereby, substantially as set forth.

In witness whereof I have hereunto signed my name this 20″ day of May, 1911, in the presence of two subscribing witnesses.

FERDINAND HUTH.

Witnesses:
 ERNEST H. L. MUMMENHOFF,
 IDA CHRIST. HAFERMANN.